United States Patent
Chen et al.

(10) Patent No.: US 10,355,860 B2
(45) Date of Patent: Jul. 16, 2019

(54) GENERATING A QR CODE (71) Applicant: EMC Corporation, Hopkinton, MA (US)

(72) Inventors: Chao Chen, Shanghai (CN); Laiqiang Ding, Shanghai (CN); Jingjing Liu, Shanghai (CN); Tony Jiang Ma, Shanghai (CN); Roby Qiyan Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 14/863,196

(22) Filed: Sep. 23, 2015

(65) Prior Publication Data

US 2016/0094345 A1  Mar. 31, 2016

(30) Foreign Application Priority Data

Sep. 28, 2014  (CN) .......................... 2014 1 0520353

(51) Int. Cl.
| | |
|---|---|
| *H04L 9/08* | (2006.01) |
| *G06K 19/06* | (2006.01) |
| *H04W 12/02* | (2009.01) |
| *H04W 12/06* | (2009.01) |

(52) U.S. Cl.
CPC ........... *H04L 9/0866* (2013.01); *H04W 12/02* (2013.01); *H04W 12/06* (2013.01)

(58) Field of Classification Search
CPC ..... H04L 9/0866; H04L 2209/34; H04L 9/08; H04L 9/00; G06K 19/06037; G06K 19/06; G06K 5/00; H04W 12/02; H04W 12/06

USPC .................... 380/28; 713/161, 165, 187, 189
See application file for complete search history.

(56) References Cited

U.S. PATENT DOCUMENTS

| | | | |
|---|---|---|---|
| 8,296,477 B1 | 10/2012 | Polk | |
| 8,640,957 B2 | 2/2014 | Yang et al. | |
| 8,676,653 B2 | 3/2014 | Argue et al. | |
| 8,687,242 B2 | 4/2014 | Amagai | |
| 8,702,001 B2 | 4/2014 | Lee et al. | |
| 2004/0131186 A1* | 7/2004 | Kasuya | H04L 9/0662 380/255 |
| 2007/0276866 A1* | 11/2007 | Bodin | G06F 17/30035 |
| 2011/0109716 A1* | 5/2011 | Choi | H04N 7/147 348/14.08 |
| 2012/0187185 A1* | 7/2012 | Sayan | G06Q 30/0601 235/375 |
| 2015/0319142 A1* | 11/2015 | Herberg | H04L 63/0428 713/171 |
| 2016/0042262 A1* | 2/2016 | Tanaka | G06K 7/1417 235/494 |

FOREIGN PATENT DOCUMENTS

| | | |
|---|---|---|
| CN | 102065267 A | 5/2011 |
| CN | 103632179 A | 3/2014 |

* cited by examiner

*Primary Examiner* — Ashokkumar B Patel
*Assistant Examiner* — Quazi Farooqui
(74) *Attorney, Agent, or Firm* — BainwoodHuang (57) ABSTRACT

The present disclosure provides a method and system for generating a QR code by receiving an inputted document; pre-processing the inputted document so as to obtain desired content; encrypting the desired content; and generating one or more QR codes based on the encrypted desired content.

16 Claims, 5 Drawing Sheets

GENERATING A QR CODE

RELATED APPLICATION

This application claims priority from Chinese Patent Application Number CN201410520353.4 filed on Sep. 28, 2014 entitled "METHOD AND SYSTEM FOR GENERATING TWO-DIMENSIONAL CODE" the content and teachings of which is herein incorporated by reference in its entirety.

FIELD

Embodiments of the present disclosure relate to the field of information sharing.

BACKGROUND

Typically offline data sharing means may use QR technology. Traditionally, QR technology may always neglects security, without taking into account the issue of preventing unauthorized reading, thereby having a risk of disadvantageously divulging the shared information, which is disadvantageous for driving information sharing. Besides, the type of information that may be shared is also very limited. For example, in the existing method of sharing data through a QR code, the input that may be accepted is usually limited to the text content, thereby limiting the type of shared information.

SUMMARY

Embodiment of the present disclosure provide a system, a computer program product and a method of generating a QR code by receiving an input document; pre-processing the inputted document to obtain desired content; encrypting the desired content; and generating one or more QR codes based on the encrypted desired content.

BRIEF DESCRIPTION OF THE DRAWINGS

The objectives, features, and advantages of the present disclosure will become more apparent through a more detailed description of the exemplary embodiments of the present disclosure with reference to the accompanying drawings, wherein same reference numerals generally represent same components in the exemplary embodiments of the present disclosure.

DETAILED DESCRIPTION

Some preferable embodiments may be described in more detail with reference to the accompanying drawings, in which the preferable embodiments of the present disclosure have been illustrated. However, the present disclosure may be implemented in various manners, and thus should not be construed to be limited to the embodiments disclosed herein. On the contrary, these embodiments are provided for the thorough and complete understanding of the present disclosure, and may completely convey the scope of the present disclosure to those skilled in the art.

As wearable and mobile devices become increasingly popular, methods for retrieving/accessing/sharing information gradually lead to advanced research. Traditionally, information sharing may be performed using networks, for example, by transmitting an email or sharing files on-line. However, where wearable and mobile devices may be involved, and because these may generally not by online, in all likelihood it may become inconvenient to implement data sharing between these devices or between these devices and traditional devices in an online manner.

Embodiments of the present disclosure provide a system, a computer program product and a method of generating a QR code. In one embodiment an input may be a received document. A further embodiment may include pre-processing an inputted document to obtain a desired content. A further embodiment may include encrypting a desired content. A further embodiment may include generating one or more QR codes based on an encrypted desired content.

In an alternative embodiment of the present disclosure, pre-processing an inputted document to obtain a desired content may include extracting a desired textual content from a document as a desired content. In an alternative embodiment of the present disclosure, pre-processing an inputted document to obtain desired content may include extracting a desired textual content from a document. Yet a further embodiment may include compressing a desired textual content to obtain a desired content. In an alternative embodiment of the present disclosure, a desired textual content may include an abstract of a document.

In an alternative embodiment of the present disclosure, encryption may include one or more of setting a password, a symmetrical encryption, a non-symmetrical encryption, a Question & Answer (Q&A) type encryption. In a further embodiment, when encryption may be a non-symmetrical encryption, a desired content may be encrypted with a public key of a key pair, while a private key of the key pair may be shared between one or more predetermined entities.

In an alternative embodiment of the present disclosure, a format of an inputted document may include one of the following: a word format, a pdf format, an excel format, and a textual format.

In an alternative embodiment of the present disclosure, a generated one or more QR codes may include at least a part of a desired content, and a link that may be directed to the rest part of the desired content. In an alternative embodiment of the present disclosure, attributes of the QR code may include color or area.

According to a second aspect of the present invention, there may be provided a system of generating a QR code. A further embodiment may include a receiving unit configured to receive an input document. A further embodiment may include a pre-processing unit configured to pre-process an input document to obtain a desired content. A further embodiment may include an encrypting unit configured to encrypt a desired content. A further embodiment may include a generating unit configured to generate one or more QR codes based on an encrypted desired content.

In an alternative embodiment of the present disclosure, the pre-processing unit may include an extracting unit and may be configured to extract a desired textual content from a document as the desired content. In an alternative embodiment of the present disclosure, a pre-processing unit may include an extracting unit that may be configured to extract a desired textual content from a document. Yet a further embodiment may include compressing unit that may be configured to compress a desired textual content to obtain a desired content. In an alternative embodiment of the present disclosure, a desired textual content may include an abstract of a document.

In an alternative embodiment of the present disclosure, the encryption may include one or more of setting a password, a symmetrical encryption, a non-symmetrical encryption, a Q&A type encryption. In a further embodiment, when an encryption may be a non-symmetrical encryption, a desired content may be encrypted with a public key of a key pair, while a private key of the key pair may be shared between predetermined one or more entities.

In an alternative embodiment of the present disclosure, a format of an input document may include one of the following: a word format, a pdf format, an excel format, and a textual format. In an alternative embodiment of the present disclosure, a generated one or more QR code may include at least a part of a desired content, and a link that may be directed to the rest part of a desired content. In an alternative embodiment of the present disclosure, attributes of a QR code may include color or area.

According to the embodiments of the present disclosure, diversity of sharing information and convenience of sharing manners may be significantly enhanced, and unauthorized reading of the shared content may be prevented to a large extent. Additionally, the embodiments according to the present disclosure may also reduce cost for sharing files and enhance overall efficiency.

Figure 1:
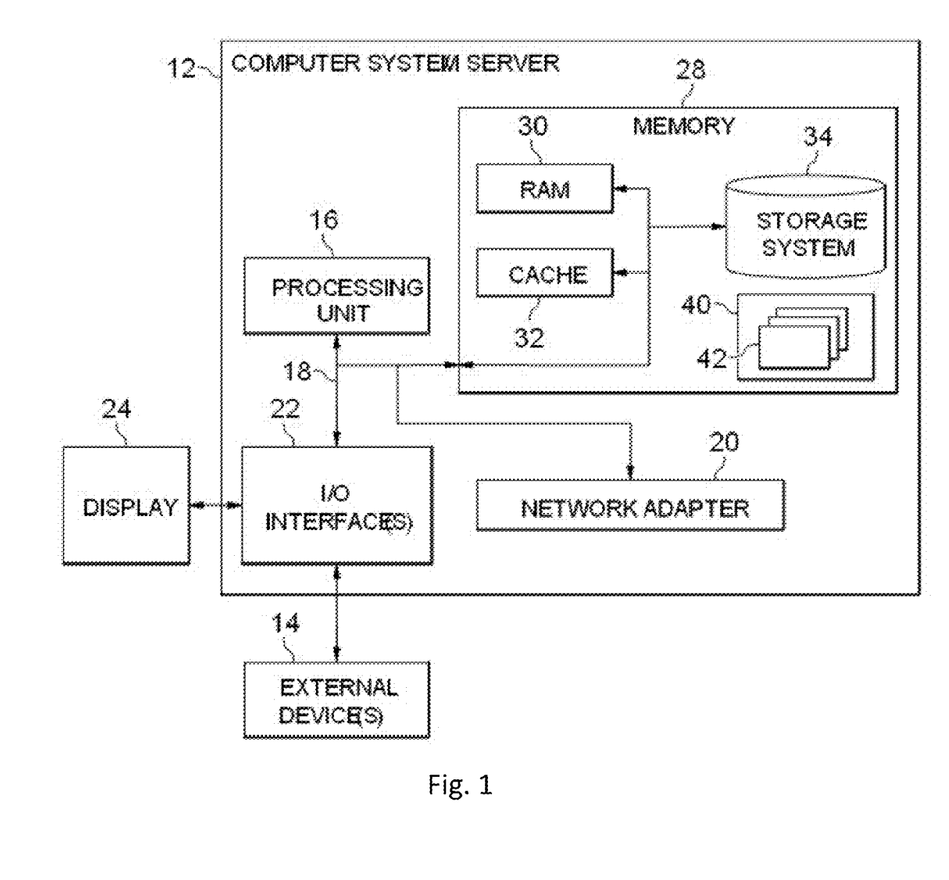
FIG. 1 illustrates a block diagram of an exemplary computer system/server 12 adapted to implement the embodiments of the present disclosure.

Referring now to FIG. 1, in which an exemplary computer system/server 12, which is applicable to implement the embodiments of the present disclosure, is shown. Computer system/server 12 is only illustrative and may not intend to suggest any limitation as to the scope of use or functionality of embodiments of the disclosure described herein.

As shown in FIG. 1, computer system/server 12 is shown in the form of a general-purpose computing device. The components of computer system/server 12 include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System memory 28 can include computer system readable media in the form of volatile memory, such as random access memory (RAM) 30 and/or cache memory 32. Computer system/server 12 may further include other removable/non-removable, volatile/non-volatile computer system storage media.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Further, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In some embodiments, computer system/server 12 typically includes a variety of computer system readable media, and such media may be any available media that is accessible by computer system/server 12, and it includes both volatile and non-volatile media, removable and non-removable media. In some other embodiment, by way of example only, storage system 34 may be provided for reading from and writing to a non-removable, non-volatile magnetic media (not shown and typically called a "hard drive"). In some other alternative embodiments, although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such embodiments, each may be connected to bus 18 by one or more data media interfaces. In certain embodiments, as will be further depicted and described below, memory 28 may include at least one program product having a set (e.g., at least one) of program modules that are configured to carry out the functions of embodiments of the invention.

Figure 2:
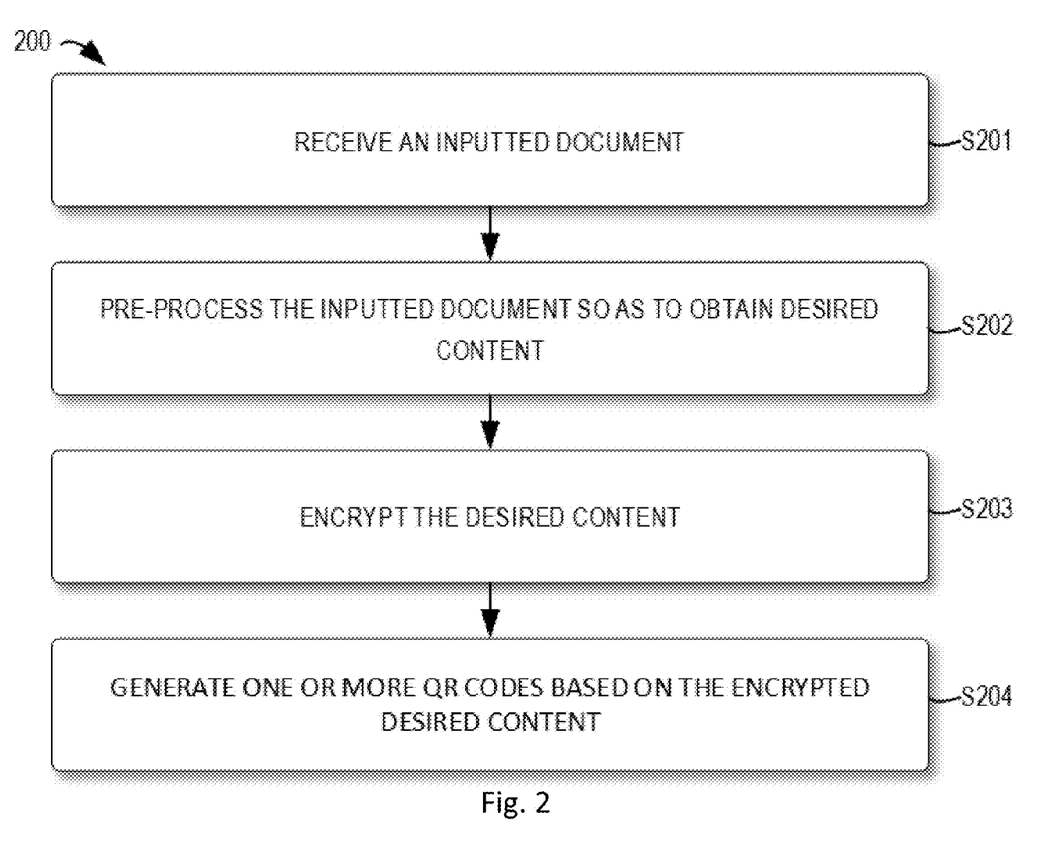
FIG. 2 illustrates a flowchart of a method 200 for generating QR code according to the exemplary embodiments of the present disclosure.

Now, refer to FIG. 2, which illustrates a flowchart of a method 200 for generating a QR according to an exemplary embodiment of the present disclosure. According to the method 200, in step S201, inputted document is first received. Next, the method 200 proceeds to step S202 to pre-process the inputted document so as to obtain the desired content. In one embodiment, the term "document" here may not only include a document of a textual format, but also may comprise a document of a word format, a document of a pdf format, a document of an Excel format, or any other type of document in the prior art, and the present disclosure is not limited in this aspect.

Figure 3:
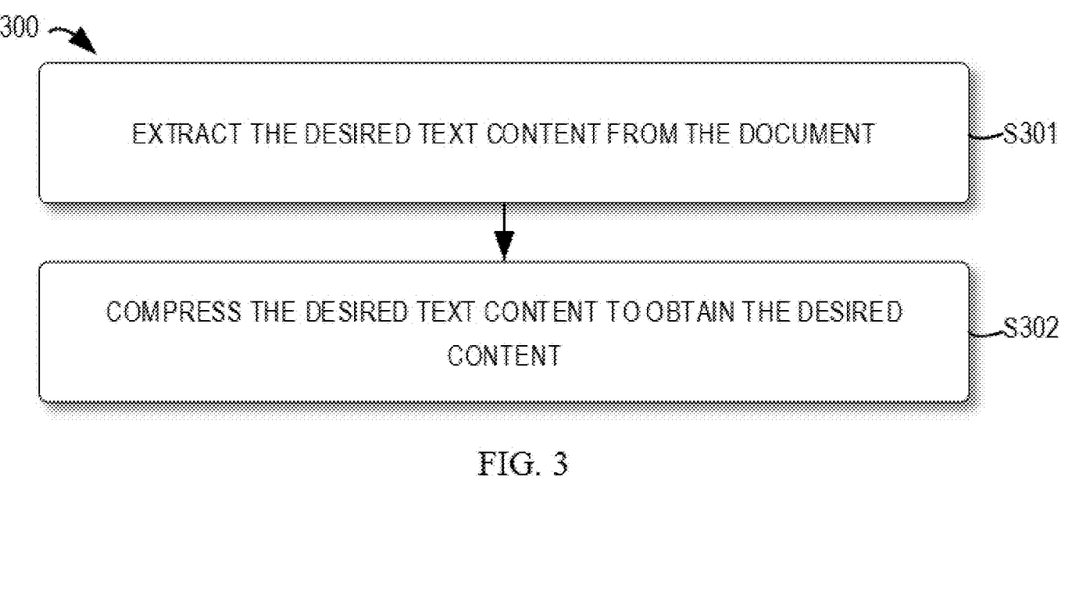
FIG. 3 shows an exemplary flowchart of pre-processing the inputted document according to an embodiment of the present disclosure.

Referring now to FIG. 3, which shows an exemplary flow diagram for pre-processing the inputted document. As shown in FIG. 3, first, the desired textual content (step S301) may be first extracted from the inputted document. Next, after the desired text content is extracted, the desired text content may also be compressed (step S302) so as to use the compressed content as the desired content for subsequent processing, thereby further reducing the size of the shared data.

In one embodiment, considering cost associated with sharing data, all inputted document contents may not be directly shared, but may be selected therefrom. In a further embodiment, because inputted documents of a word or a pdf format may always include a variety of format information that are not necessary for data sharing, it may always occupy a relatively large storage space. In a further embodiment, a desired inputted content may be, for example, an abstract portion already existing in the inputted document, or a content of the designated part; or text content extracted using any of text extraction tools in the prior art; or an abstract or brief introduction generated by using any abstract generating tool in the prior art based on the content of the document. In another embodiment, extracted text content may be directly used as the desired content of step S202, i.e., not going through step S302 of FIG. 3. Those skilled in the art would appreciate that compression of the text content may be performed through any of compression tools or compression algorithms (e.g., 7Zip) in the prior art, and the present disclosure is not limited in this aspect.

In the case of comprising a compressing step S302, as illustrated in FIG. 3, sometimes (e.g., in a compression testing adopting file compression software) the compression rate may reach 86%, such that finally, the size of the text that that can be finally shared may increase to 7 times (in a particular scenario or even more), saving cost. In one embodiment, during implementation, a head may be added to the compressed content so as to indicate the compression setting as follows (but not limited to the following content):

| Field | Description |
| --- | --- |
| Compression setting | Algorithm type (e.g., 7Zip), used compression parameter, etc. |
| Compressed content | Compressed content in the previous step |

Return back to the description of FIG. 2, the method 200 proceeds to step S203 to encrypt the desired content. In one embodiment, in order to enhance security of sharing data, encryption may be performed using encryption approaches in any prior art. In a further embodiment, these encryption approaches include, but may not limited to one or more of: setting a password, a symmetrical key encryption, a non-symmetrical key encryption, and a Q&A type encryption. In a further embodiment, setting a password and a symmetrical key encryption are relatively simple encryption approaches. In a further embodiment, it may be desired that the sender of a shared content and a receiver obtaining the content may share in advance a password/key, and a sender may encrypt a desired content, while a receiver may decrypt using a shared password/key. In a further embodiment, the Q&A type encryption may be based on a fact that a sender and a receiver understand a particular answer to a particular question. In a further embodiment, if a sender and a receiver have a private relationship (for example, father and son) so as to understand private information, a sender may set a particular question (e.g., "what is my nickname?") and answer (e.g., "Xiaoming") based thereupon, without a need of additionally sharing a key with a receiver.

In a further embodiment, besides, a non-symmetrical key encryption (e.g., a RSA algorithm) may be another encryption approach that may be applied flexibly. In a further embodiment, in this approach, each role (e.g., corporation, group, team or user) may have its own public-private key pair.

Figure 4:
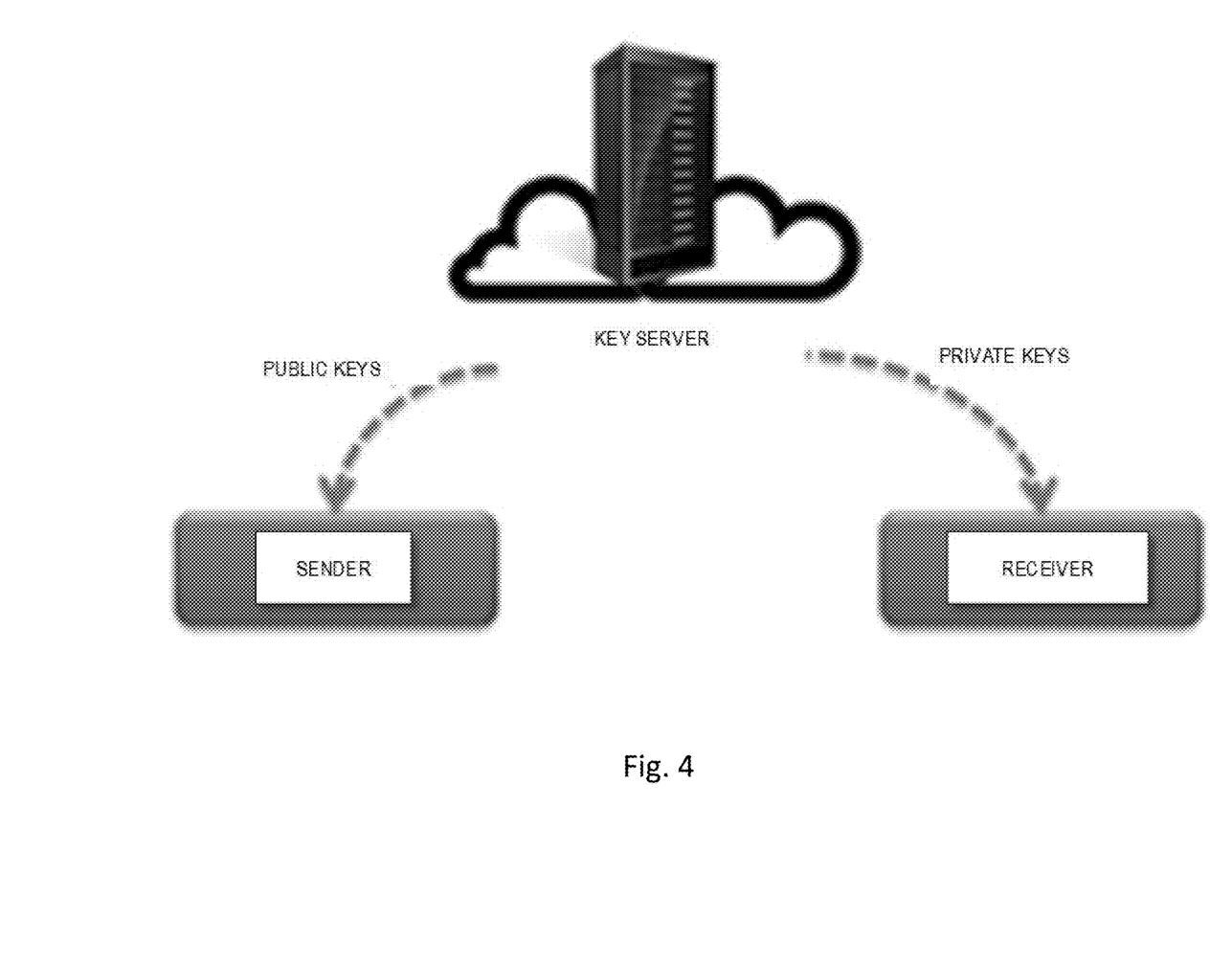
FIG. 4 shows a schematic diagram of encrypting with a non-symmetrical key according to the exemplary embodiments of the present invention.

Referring now to FIG. 4, which shows a schematic diagram of encrypting with a non-symmetrical key according to the exemplary embodiments of the present disclosure. As shown in FIG. 4, the respective public keys and private keys of a sender, a receiver and all other entity (not shown in FIG. 4) may be saved in the key server, wherein the public key is available for any entity to access. When the sender desires to share content with the receiver, sender may (1) access a key server to obtain a public key of a given receiver; (2) encrypt the content desired to be shared with the public key. Correspondingly, after a receiver obtains the encrypted content, receiver may use receiver's own existing private key to decrypt the content.

In some embodiments, considering further security, a public key and a private key may be periodically updated, which may likely cause that the private key in the hand of the receiver might not be the latest one. In a further embodiment, in this case, a receiver may obtain a latest private key from a key server so as to decrypt content. In a further embodiment, if a key used by the receiver upon encryption may not the latest due to various reasons, receiver may be unable to decrypt content with the latest obtained private key receiver. In a further embodiment, receiver may try one or more private keys previously (expired) saved by receiver one by one, rather than directly discarding content after decryption fails using the latest private key. In a further embodiment, update of a private key may be performed through various manners, e.g., a key server may be implemented by periodically pushing or online pushing latest private keys to various entities, or autonomously extracting by various entities, and the present disclosure is not limited in this aspect.

In a further embodiment, additionally, when a single sender may require/want to share same content with a plurality of receivers (not shown in FIG. 4), it may obtain a public key of each receiver from a key server respectively, and individually encrypt the shared content for each receiver using each public key. In an alternate embodiment, a sender may set a virtual set for a plurality of receivers, and create a public-private key pair for a virtual set (which likewise may be stored in the key server). In a further embodiment, in this way, a sender may only need one encryption. In a further embodiment, all given receivers in the virtual set may also only need to obtain the private keys created by the virtual set through various possible manners (not limited in the present disclosure), i.e., decrypting received content on their own. In a further embodiment, in a non-symmetrical encrypting approach, a public key of a key pair may be used to encrypt desired content, while a private key of a key pair is shared between predetermined one or more entities.

In one embodiment, during implementation, a header may be added to the encrypted content to indicate the settings for encryption as follows (but not limited the following content):

| Field | | Description |
| --- | --- | --- |
| Encryption setting | Algorithm type | Encryption methods such as non-symmetrical encryption, Q&A type encryption, no encryption, etc. |

-continued

| Field | Description |
|---|---|
| Encryption information | In case of non-symmetrical encryption, it may include: role ID of the reader, expiration date and time of the key, etc. |
| Encrypted content | Encrypted content of the previous steps |

Return back to the description of FIG. 2, method 200 the subsequently proceeds to step S204, generating one or more QR codes based on the encrypted desired content. In one embodiment, attributes of the "QR code" here may involve area, or color, i.e., the "QR code" may be a colored QR code or a QR code expanded on an area of the traditional QR code. In one embodiment, during implementation, generation of the QR code may be implemented by virtue of some common tools (e.g., the software development kit SDK) in the prior art. In a further embodiment, because the QR code may only store data of limited size, different policies may be employed when the size of the content desired to be shared may be relatively large. In an example embodiment, for desired content with a relatively large size, it may be implemented by generating a colored large-size QR code such as PM code.

In a further embodiment for a desired content with a larger size, the following one or more policies may be considered (but not limited thereto):

(1) Generating a plurality of QR codes for a single desired content. In a further embodiment, during implementation, encrypted desired content may be divided into a plurality of pieces in step S203 and stored in a plurality of QR codes. In further embodiment, a checksum or like manner may be employed to ensure error free of partition of the desired content and corresponding combination.

(2) Having the generated one or more QR codes include at least a part (preferably a first part) of the desired content, and a link may be directed to the rest part of the desired content. Method 200 ends.

In one embodiment, it may be seen that the information that may be shared by the method of generating QR code according to the embodiments of the present disclosure may not limited to the content in textual format, but may be extended to a plurality of types of documents, which may be more convenient for a user. In a further embodiment, additionally, size of a processed object may be further reduced through a pre-processing step, thereby saving cost. In a further embodiment, in terms of security, the method for generating QR code according to the embodiments of the present disclosure may protect security of the shared content by introducing a plurality of encryption approaches, while a flexible policy of the step of generating QR code may further break through the limit of the capacity of the QR code per se, such that the content with a larger size may be shared.

In an additional embodiment, it needs to be mentioned that the QR code obtained through the method 200 may be distributed in various manners (online or offline), for example, a common manner is shooting or scanning.

In a further embodiment, in application, an entity obtaining the QR code in various manners may read the content within the QR code, decrypt the content, and optionally decompress the content so as to view the content, thereby achieving the technical effect of sharing information between various entities.

Figure 5:
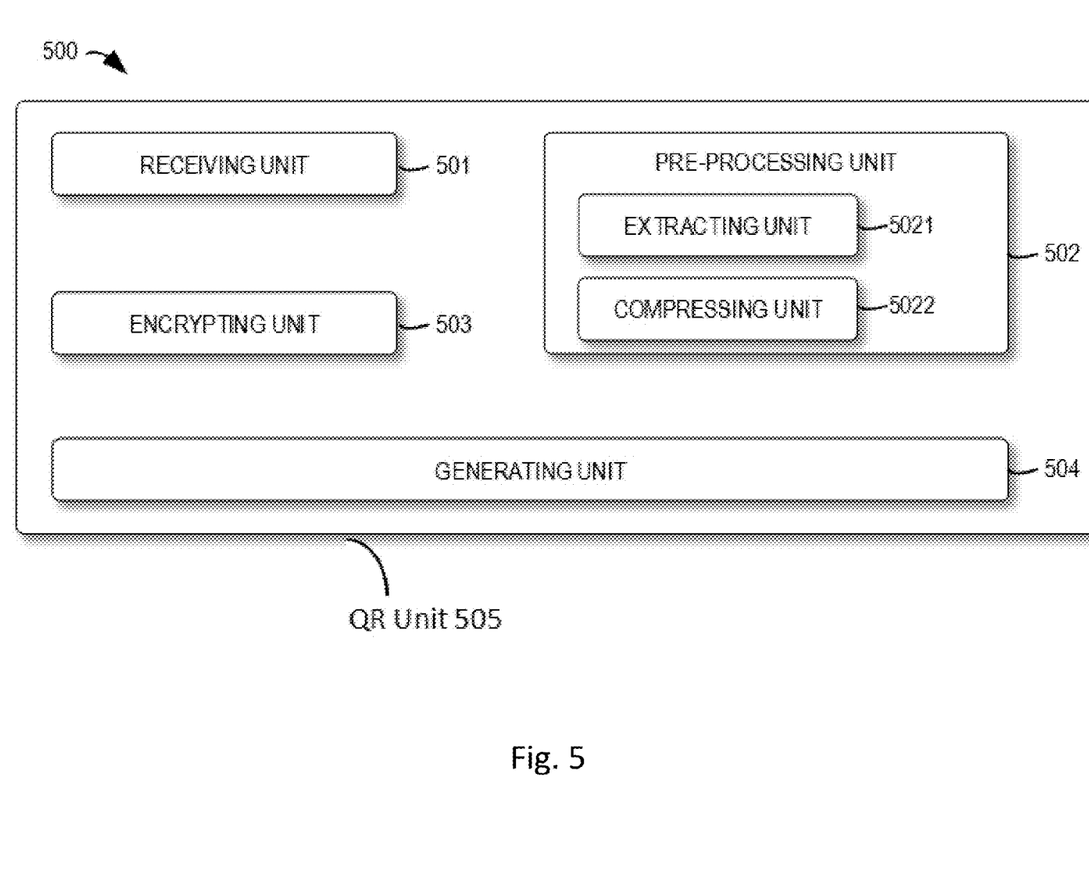
FIG. 5 shows a schematic block diagram of a system 500 for generating a QR code according to the exemplary embodiments of the present invention.

Next, with reference to FIG. 5, a schematic block diagram of a system 500 for generating QR code according to the exemplary embodiments of the present disclosure may be further described.

As shown in the figure, the system 500 comprises receiving unit 501 configured to receive the inputted document; pre-processing unit 502 configured to pre-process the inputted document so as to obtain the desired content; encryption unit 503 configured to encrypt the desired content; and generating unit 504 configured to generate one or more QR codes based on the encrypted desired content. In one embodiment, a single QR unit 505 may replace each of these individual units and QR unit 505 may perform the tasks associated with each of the above mentioned units in a given order so as to achieve the end result desired.

In an optional embodiment of the present disclosure, the system 500 may further include an extracting unit configured to extract the desired text content as the desired content from the document (not shown).

In a further optional embodiment, system 500 may further include extracting unit 5021 configured to extract the desired text content from the document. In a further optional embodiment, system 500 may further include compression unit 5022 configured to compress the desired textual content to obtain the desired content.

In an optional embodiment, a desired text content includes an abstract of a document. In an optional embodiment, encryption may include setting one or more of password, a symmetrical encryption, a non-symmetrical encryption, and a Q&A type encryption. In a specific embodiment, when encryption is a non-symmetrical encryption, desired content may be encrypted with a public key of a key pair, while the private key of the key pair may be shared between one or more entities.

In an optional embodiment, format of an inputted document includes one of the following: a word format, a pdf format, an excel format, and a text format.

In an optional embodiment, generated one or more QR codes may include at least a part of desired content, and may further include a link that may be directed to the rest part of the desired content.

In an optional embodiment, attributes of the QR code may include color or area.

The present disclosure may be a system, method and/or computer program product. The computer program product may include a computer readable storage medium, on which computer readable program instructions are loaded for enabling the processor to implement various aspect of the present invention.

The computer readable storage medium can be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for securely sharing documents between one or more mobile or wearable devices comprising:
   receiving, from a document sender, an input document;
   pre-processing the input document to obtain a desired content, wherein the pre-processing includes extracting text from the input document and compressing the extracted text to obtain the desired content;
   receiving a first password from the document sender;
   encrypting the desired content using the first password;
   calculating a checksum for the encrypted desired content;
   generating multiple Quick Response (QR) codes for the encrypted desired content, each QR response code generated based on a corresponding portion of the encrypted desired content;
   receiving a second password from an intended document recipient;

comparing the first password to the second password; and decrypting the encrypted desired content using the second password in response to the first password matching the second password.

2. The method according to claim 1, wherein the desired content includes an abstract of the document.

3. The method according to claim 1, wherein the encryption comprises at least one from the group of: setting a password type encryption, a symmetrical encryption, a non-symmetrical encryption, and a Question & Answer type encryption.

4. The method according to claim 1, wherein format of the document includes one from the group of: a word format, a pdf format, an excel format, a text format.

5. The method according to claim 1, wherein the generated one or more QR codes include at least a part of the desired content, and a link directed to a remaining part of the desired content.

6. The method according to claim 1, wherein attributes of the QR code include color or area.

7. The method of claim 1 further comprising:

determining a size of the encrypted desired content; and, in response to the size of the encrypted desired content checksum exceeding a threshold, dividing the encrypted desired content into multiple portions.

8. A system for securely sharing documents between one or more mobile or wearable devices, comprising:

a Quick Response (QR) unit enabled to generate QR codes; and computer-executable program logic encoded in memory of one or more computers enabled to manage the QR unit, wherein the computer-executable program logic is configured for the execution of:

receiving, from a document sender, an input document;

pre-processing the input document to obtain a desired content, wherein the pre-processing includes extracting text from the input document and compressing the extracted text to obtain the desired content;

receiving a first password from the document sender;

encrypting the desired content using the first password;

calculating a checksum for the encrypted desired content;

generating multiple Quick Response (QR) codes for the encrypted desired content, each QR response code generated based on a corresponding portion of the encrypted desired content;

receiving a second password from an intended document recipient;

comparing the first password to the second password; and decrypting the encrypted desired content using the second password in response to the first password matching the second password.

9. The system of claim 8, wherein the desired content includes an abstract of the document.

10. The system of claim 8, wherein the encryption comprises at least one from the group of: setting a password type encryption, a symmetrical encryption, a non-symmetrical encryption, and a Question & Answer type encryption.

11. The system of claim 8, wherein format of the document includes one from the group of: a word format, a pdf format, an excel format, a text format.

12. The system of claim 8, wherein the generated one or more QR codes include at least a part of the desired content, and a link directed to a remaining part of the desired content.

13. The system of claim 8, wherein attributes of the QR code include color or area.

14. The system of claim 8, wherein the computer-executable program logic is further configured for the execution of:

determining a size of the encrypted desired content; and, if the size of the encrypted desired content exceeds a threshold, dividing the encrypted desired content into multiple portions.

15. A computer program product for securely sharing documents between one or more mobile or wearable devices the computer program product comprising:

a non-transitory computer readable medium encoded with computer-executable code, the code configured to enable the execution of:

receiving, from a document sender, an input document;

pre-processing the input document to obtain a desired content, wherein the pre-processing includes extracting text from the input document and compressing the extracted text to obtain the desired content;

receiving a first password from the document sender;

encrypting the desired content using the first password;

calculating a checksum for the encrypted desired content;

generating multiple Quick Response (QR) codes for the encrypted desired content, each QR code generated based on a corresponding portion of the encrypted desired content;

receiving a second password from an intended document recipient;

comparing the first password to the second password; and decrypting the encrypted desired content using the second password in response to the first password matching the second password.

16. The computer program product of claim 15, the code further configured to enable the execution of determining a size of the encrypted desired content; and, in response to the size of the encrypted desired content exceeding a threshold, dividing the encrypted desired content into multiple portions.

* * * * *